United States Patent
Iotti

(10) Patent No.: US 7,579,804 B2
(45) Date of Patent: Aug. 25, 2009

(54) METHOD TO MEASURE THE ANGULAR SPEED OF AN INDUCTION MOTOR

(75) Inventor: Maurizio Iotti, Bagnolo in Piano (IT)

(73) Assignee: ZAPI S.p.A., Poviglio (RE) (IT)

( * ) Notice: Subject to any disclaimer, the term of this patent is extended or adjusted under 35 U.S.C. 154(b) by 619 days.

(21) Appl. No.: 11/336,634

(22) Filed: Jan. 20, 2006

(65) Prior Publication Data

US 2007/0108935 A1    May 17, 2007

(30) Foreign Application Priority Data

Nov. 14, 2005   (EP) .................................. 05024835

(51) Int. Cl.
| | |
|---|---|
| H02P 1/26 | (2006.01) |
| H02P 1/42 | (2006.01) |
| H02P 3/18 | (2006.01) |
| H02P 23/00 | (2006.01) |
| H02P 25/00 | (2006.01) |
| H02P 27/00 | (2006.01) |

(52) U.S. Cl. ...................................... 318/772; 318/779
(58) Field of Classification Search ................. 318/772, 318/779
See application file for complete search history.

(56) References Cited

U.S. PATENT DOCUMENTS

| 6,894,454 B2 * | 5/2005 | Patel et al. ................... 318/700 |
| 7,262,569 B2 * | 8/2007 | Douglas ................. 318/400.34 |

* cited by examiner

*Primary Examiner*—Bentsu Ro
*Assistant Examiner*—Erick Glass
(74) *Attorney, Agent, or Firm*—IP Strategies

(57) ABSTRACT

The invention relates to a method for determining the electric angular speed of a rotor of an induction motor, wherein electric power supplied to phases of a stator of the induction motor affects the rotor, comprising the steps of: switching off the electric power supply to the phases of the stator during a particular period of time, picking-up signals corresponding to voltages at the stator phases within the particular period of time, and determining the electric angular speed of the rotor based on the picked-up signals.

20 Claims, 6 Drawing Sheets

METHOD TO MEASURE THE ANGULAR SPEED OF AN INDUCTION MOTOR

FIELD OF THE INVENTION

The present invention relates to a method for determining the electric angular speed of a rotor of an induction motor, wherein electric power supplied to phases of a stator of the induction motor affects the rotor.

BACKGROUND OF THE INVENTION

An induction motor is driven by currents generated by voltages applied to the phases of a stator of the induction motor, which are in general AC currents of different frequency. This frequency starts from zero (or close to zero) when the motor is standing and increases according with a speed command (e.g. in a vehicle with an operator aboard, a throttle actuated by the operator supplies the speed command).

Throughout the operative mode of the control the phases of the induction motor are subject to the AC currents. These currents may have different values (depending on the load and the dynamic torque), but they are always present because at least the magnetisation current generated by the main inductance is always drained by the motor including the case of a null output torque (synchronism).

Unlike a Brushless Permanent Magnet motor, the control of an Induction motor does not ask for the rotor position; it only asks for the rotor speed. In an induction motor, the frequency must be tuned in a narrow frequency band, around the angular motor speed in order the control properly works. The correct terminology is that the ωslip of the motor, i.e. the difference between the frequency applied to the motor phases and the electric angular rotor speed (electric angular rotor frequency) must be limited in the linear torque characteristic of the induction motor (FIG. 1). When the ωslip is positive, the motor is driving the load; when the slip is negative, the motor is braking the load.

When the ωslip is outside the linear torque characteristic, the torque collapses although the inverter is supplying the maximum current to the motor (Imax Clamped area in FIG. 1). In order to verify if the control is properly working or not it is just enough to know the ωslip. As the applied frequency is generated by the control, the angular speed is the only unknown variable.

The prior art deals with methods to measure the speed and position of the rotor in an electrical motor without speed sensors at the motor shaft (sensorless control). These methods normally work by introducing proper test signals, together with the main controlling quantities, in the motor to show up some saliency or nonlinear property of the rotor self. Then by monitoring the effect of the test signals injection, it is possible to detect the speed and the position of the rotor (e.g. the INFORM method could be a good example for this prior art method; INFORM=INdirect Flux detection by On-line Reactance Measurement).

Unfortunately these methods are quite complicated and can fail whenever the saliency (degree of alignment in a preferred direction of the magnetisation) of the magnetic core is not high enough.

At last, all of these methods with signals injection, generate harmonics in the motor with audible noise and torque ripple.

Anyway, applications are known of these methods in combination with Brushless Permanent Magnet Motor; for the Induction motor the application of these method is even more compromised because the saliency must be extrapolated from the main magnetic field. Meanwhile in a Brushless Permanent Magnet Motor, the main magnetic field at the rotor has a fixed value in time and rotor coordinates (due to the Permanent Magnets), in an Induction motor the main magnetic field has a complicate evolution due to the wide dynamic profile (different levels and slopes) of the magnetisation current.

BRIEF SUMMARY OF THE INVENTION

To avoid the mentioned disadvantages of the prior art, the problem underlying the present invention is to provide an alternative method to measure the speed (not the position) of an induction motor, which in particular is applicable when no sensor is connected to the motor shaft.

The above problem is solved by a method for determining the electric angular speed of a rotor of an induction motor, wherein electric power supplied to phases of a stator of the induction motor affects the rotor that comprises the steps of:

switching off the electric power supply to the phases of the stator during a particular period of time, picking-up signals corresponding to voltages at the stator phases within the particular period of time, and determining the electric angular speed of the rotor based on the picked-up signals.

According to the inventive method, when the angular speed is required, it is just enough to switch off all the power supply (preferably at the same time) during a particular period of time, and thereby to let the stator motor currents decay to zero value (this normally takes fractions of milliseconds), e.g. by draining the currents on a DC link. This DC link normally provides the supply to the power transistors that generate AC currents into the phases of the motor. When the power transistors are switched off, the residual electrical energy in the motor will be drained into the DC link.

Then signals are picked-up that correspond to voltages at the stator phases within the particular period of time, usually after a very short settlement delay (a fraction of a millisec up to a few millisecs). Based on the picked-up signals the angular speed of the rotor is determined.

The power supply can be turned on again, coming back to the previous control of the induction motor. To perform the above monitoring sequence generally takes a very short time (usually from fraction of millisecond up to few milliseconds only).

This method does not use saliency and has a very simple and clear implementation.

A development of the inventive method is that picking-up the signals begins after a time lag $t_0$ has elapsed since the electric power has been switched off.

This development has the advantage that the picking up of the signals or of a first signal in a time series are or is, respectively, not coincident with the switching off of the electric power.

A further development of the previous development is to choose the time lag $t_0$ be greater than a decay time it takes for the stator currents to zero out since the electric power has been switched off.

This development has the advantage that the transient generated in the motor by the switching off has vanished and the stator currents in the motor have decayed down to zero when picking-up the signals.

A further development of the two previous developments is to choose the time lag $t_0$ to be smaller than exponential decay times of magnetisation currents that flow in the rotor at the time the electric power is switched off.

This development has the advantage that the currents in the rotor have not decayed substantially, so that measurable voltages may be induced in the stator phases.

A further development of the inventive method and the previous developments is to pick-up the signals in a time series comprising one or more pairs of points in time, each pair comprising a first and a second point in time with a time increment in between the first and the second point in time, and at least two points in time of the time series being coincident for each stator phase.

This development has the advantage that, by exploiting such a set of data, a simple set of differential equations can be used to determine angular speed of the rotor.

A further development of the previous development is to choose the time series in such a way that the time increment is equal for each pair of points in time.

This development has the advantage that the angular speed of the rotor can be determined several times and the results thereof may be averaged to reduce a possible error.

A further development of the two previous developments is to choose the time series in such a way that a time difference between successive pairs of points in time is constant in time or wherein the time difference between successive pairs of points in time increases with time or wherein a time difference between successive pairs of points in time decreases with time.

This development has the advantage that either the determination of the angular speed of the rotor can be adjusted in order to collect consistent increments/decrements of the picked-up signals, or that the angular speed of the rotor can be determined several times and the result thereof may be averaged to reduce a possible error.

A further development of the previous three developments is to choose the time increment for each pair of points in time to be smaller than one quarter of the revolution period of an upper limit to the electric angular speed.

This development has the advantage that no ambiguity of trigonometric functions involved in the determination of the angular speed of the rotor arises.

A further development of the inventive method and the previous developments is to determine the voltages at the stator phases based on the picked-up signals.

This development has the advantage that the voltages at the stator can be used for the determination of the angular speed of the rotor.

A further development of the inventive method and the previous developments is to control the induction motor in a sensorless way, preferably according to the difference between a frequency of the electric power supplied to the stator and the angular rotor speed.

This development has the advantage that no sensors are required to control the induction motor, in particular, no position sensors and/or speed sensors are required. The induction motor is then preferably controlled only according to the difference between a frequency of the electric power supplied to the stator and the determined angular rotor speed.

A further development of the inventive method and the previous developments is to provide an inverter comprising power transistors for supplying the electric power to the stator phases.

This development has the advantage that a simple and generally available device for the generation of AC electric power from a DC source can be used.

A further development of the inventive method and the previous developments is to provide a control/processing unit for controlling and processing purposes.

This development has the advantage that this control/processing unit can be used for controlling and processing purposes such as controlling the induction motor including the generation of the respective frequencies at the stator phases e.g. during the driving of a load and/or determining/calculating specific operational parameters.

A further development of the inventive method and the previous developments is that the switching is performed by the control/processing unit.

This development has the advantage that the control/processing unit can perform the switching off and on of the power supply of the stator phases at beginning and the end of the particular period of time.

A further development of the two previous developments is that the angular speed of the rotor is determined by the control/processing unit.

This development has the advantage that the control/processing unit can also perform the determination/calculation of the electric angular speed of the rotor, such that no separate unit is required for this purpose.

A further development of the inventive method and the previous developments is to provide at least one interface unit for attenuating and/or filtering the picked-up signals, and when a control/processing unit is provided, to arrange the at least one interface unit between the phases of the stator and the control/processing unit.

This development has the advantage that such an interface unit may be used to attenuate and/or filter the picked-up signal in order to adjust the signal level to a desirable level and/or reduce the influence of interfering signals.

A further development of the inventive method and the previous developments in combination with a time lag, is to choose the time lag to be greater than a decay time of transients generated in the at least one interface unit by the switching off of the electric power supply, so that e.g. the delay for the output of the interface unit is taken into account.

This development has the advantage that the influence of transients that may be generated e.g. during the switching off and on of the power supply can be reduced or eliminated.

A further development of the inventive method and the previous developments is to pick-up the stator signals or voltages via at least two sensing coils mutually coupled to at least two phases of the stator. Such a method is disclosed in the documents IT PR2004A000009 and US 2005/0189902 A1.

This development has the advantage that the stator signals or voltages may be picked-up in a convenient manner.

A further development of the inventive method and the previous developments is to apply the method to a three phase induction motor or a two phase induction motor.

This development has the advantage that a common induction motor with three phases can be operated and controlled with the help of the inventive method and its developments.

A further development of the previous development in the case of a three phase induction motor is to determine the angular speed of the rotor based on an equivalent two-phase model of electrical components of the three phase induction motor.

This development has the advantage that the determination of the angular speed of the rotor can be performed in a simple manner.

A further development of the inventive method and the previous developments is that the determination of the angular speed of the rotor begins and preferably as well ends within the particular period of time.

This development has the advantage that the desired angular speed of the rotor may be available already when the induction motor is back in the normal operational mode.

A further development of the inventive method and the previous developments is that the determination of the angular speed of the rotor begins after the particular period of time.

This development has the advantage that the induction motor returns to its normal operational mode as soon as possible and a possibly lengthier determination of the angular speed of the rotor is performed after the power supply has been switched on again. This minimises the duration of the interval with switched off power supply.

A further development of the inventive method and the previous developments is to determine a mechanical angular speed of the rotor based on the determined electric angular speed of the rotor.

This development has the advantage that it provides the mechanical angular speed of the rotor.

Further details of the inventive method and its developments with respect to an example of an induction motor with three phases will be given below.

Method Description

As it is very simple, we will introduce the technical implementation first; the more elaborate theoretical analysis will follow further below.

We consider a three phase induction motor controlled by a three phase inverter. This three phase inverter consists of three half bridge topology (FIG. 2), one for each motor phase. The half bridge topology uses solid state power transistors (e.g. power Mosfet, IGBT, BJT or the like). Further, a DC link supply source is involved. This DC link must be able to drain currents (e.g. a battery or a DC rail with ballast). The control/processing unit is to be understood as a proper Hardware and Software arrangement, smart enough to perform all the motor control activities described here.

Whatever the algorithm to control the induction motor is, it always works by introducing a three phase AC currents of different frequency in the motor phases. This frequency starts from zero (or close to zero) when the motor is standing still and increases according with a speed command whatever the source of this command information is (e.g. in a vehicle with operator aboard, a throttle supplies the speed command).

Throughout the operative mode of the control the induction motor is subject to a three phase AC current that forms a spatial current vector. This current vector may have different amplitudes (depending by the load and dynamic torque), but it is always present because at least the magnetisation current is always drained by the motor including the case of a null output torque (synchronism).

The presence of a non-null magnetisation current (i.e. motor excited with a non-null main magnetic flux in the motor) is the only condition needed for a satisfactory application of the method according to the invention.

Then, when the speed is required, it is just enough to switch off preferably at the same time all of the power transistors in the inverter and to let the stator motor currents decay to zero on the DC link (this normally takes fractions of milliseconds).

After a very short settlement delay (fraction of millisec up to few millisecs), the voltage in the three phases of the motor is monitored and recorded in some successive sampling collection. Then the power transistors turn on again, coming back to the previous induction motor control. To perform the above monitoring sequence takes a very short time (from fraction of millisecond up to few milliseconds only).

A proper elaboration of the collected data will supply the desired angular speed information.

Before the theoretical approach will be described, it is better to deepen step by step what happens in the above sequence.

By opening the power transistors of the inverter, the stator currents in the motor are no more supported by the inverter; i.e. they can only decay. Let us consider the example in FIG. 3. Here ias and ics are supposed to be positive (with ias>ics) and ibs negative. After switching off the power transistors, ias and ibs tend to be driven from a minus battery to a plus battery voltage (see ias vs. vas and ibs vs. vbs in FIG. 3). Both of them meet a voltage barrier and tend to decay. The third current is freewheeling on a null voltage (ics vs. vcs=0 in FIG. 3) but it is a temporary situation because as soon as the decaying ias will be zeroed, ia will reverse its direction (it was coming up from the minus battery; now it goes into the plus battery voltage) and encounter a voltage barrier, so ics reduces too.

During the stator currents decaying transient, the stator voltages assume a triad of DC voltage (null frequency) involving the battery voltage reference (vas, vbs and vcs in FIG. 3). As the stator voltages in the decaying transient are of null frequency, the back electromotive (bemf in FIG. 3) tends to be very low. (bemf is proportional to the applied frequency).

So there are three stator currents that are kept up by the stray stator inductance (Ids) only, and decay with a negative slope proportional to the difference between the battery voltage and a very low back electromotive force.

On the other side, the magnetisation current is supported by the main magnetisation inductance ($L_m$) and decays with a slope proportional only to the very low back electromotive force. Besides the stray stator inductance is one order of magnitude smaller than the main magnetisation inductance. That means the stator current, in every phase, reaches zero value meanwhile the magnetisation current is not decayed yet (or just a little decayed) with respect to the value it had at the switching off the power transistors.

For an easier explanation, it is ignored here to calculate the back electromotive force during the stator currents decaying transient because it is a difficult approach and not of much use. Nevertheless, an empirical approach confirms that the stator currents decaying transient take a very short time (we have experienced fractions of millisecond in the application described in the following).

After this transient, the stator currents are zeroed and only the magnetisation currents flow inside the rotor and support the flux continuity in the motor. So, we have null stator currents meanwhile the rotor currents are not null yet. The model per phase of the motor now is a main inductance ($L_R$) in parallel with the rotor resistance ($R_R$) and a non-null current is flowing in this simple closed circuit. This direct rotor current decays exponentially with a rotor time constant ($T_R=L_R/R_R$), e.g. a 24V 800 W motor has $L_R$=1.16 mH and $R_R$=33 mohms, i.e. $T_R$=35 msec.

By observing the effects of this rotor current decaying through the motor connections, we will see the voltages at the stator terminals are not null: in fact the slow decaying currents flowing in the rotor phases are mutually coupled with the three stator phases. As a consequence of the rotor phases rotation, the stator windings are faced with a time variable flux resulting in non-null voltages according with the Faraday law:

$$emf=-d\phi/dt$$

The values of the emf in these conditions are sampled and collected for a very short time (from fraction of millisecond up to few milliseconds) before to turn the power transistors on again.

The elaboration of these data to calculate the angular speed of the rotor, i.e. the motor speed, will be preferably performed after the control has been re-activated. This is suggested in order to minimise the duration of the interval with switched off transistors.

Theoretical Analysis

To deepen the understanding of the method according to the invention in a theoretical analysis it is necessary to introduce the complete dynamic model of an induction motor with three phases. In the literature reference is usually made to an equivalent two phase model of the original three phase motor. This transition is done by applying the Clarke transformations to the original three phase electrical components. Below (Formula 1 and Formula 2) are the Clarke transformations applied to the stator flux components:

$$\begin{bmatrix} \varphi qs \\ \varphi ds \end{bmatrix} = \begin{bmatrix} \frac{1}{\sqrt{3}} & \frac{2}{\sqrt{3}} \\ 1 & 0 \end{bmatrix} \begin{bmatrix} \varphi as \\ \varphi bs \end{bmatrix} \quad \text{Formula 1}$$

and vice versa $$\begin{bmatrix} \varphi as \\ \varphi bs \end{bmatrix} = \begin{bmatrix} 0 & 1 \\ \frac{\sqrt{3}}{2} & -\frac{1}{2} \end{bmatrix} \begin{bmatrix} \varphi qs \\ \varphi ds \end{bmatrix} \quad \text{Formula 2}$$

with:

φqs, φs: stator flux components in the two phase equivalent model.

φas, φbs: stator flux components in the a and b phases of the three phase model.

Together with the flux components, the application of the Clarke transformations to the voltage and current components complete the compilation of the quantities used in the equivalent two phase model.

Then the model of the motor, with null stator currents, in stator coordinates becomes the dynamic model below:

$$\varphi qs = L_m iQs \quad \text{Equations 1.1 to 1.9}$$
$$\varphi ds = L_m iDs$$
$$\varphi Qs = L_R iQs$$
$$\varphi Ds = L_R iDs$$
$$vqs = \frac{d\varphi qs}{dt}$$
$$vds = \frac{d\varphi ds}{dt}$$
$$0 = R_R iQs + \frac{d\varphi Qs}{dt} - \omega_r \varphi Ds$$
$$0 = R_R iDs + \frac{d\varphi Ds}{dt} + \omega_r \varphi Qs$$

-continued
$$T_m = 0$$

with (for future reference also other symbols and their meanings are listed below):

φQs, φDs: rotor flux components iqs, ids: stator current components iQs, iDs: rotor current components vqs, vds: stator voltage components $\omega_r$: (electrical) angular speed of the rotor $\omega_r = p\Omega_r$, $\Omega_r$: real angular speed of the rotor.

p: poles pair number $T_m$: motion torque $L_S$: stator inductance $L_m$: magnetisation inductance $L_R$: rotor inductance Ids: stator stray inductance ($L_s = L_m + \text{Ids}$)

Idr: rotor stray inductance ($L_R = L_m + \text{Idr}$)

$R_S$: stator resistance $R_R$: rotor resistance $T_R$: rotor time constant $L_R/R_R$ It is pointed out the above model refers to an induction motor with zeroed stator currents while the rotor currents are not null yet. That is exactly the case for the induction motor after switching off the power transistors and after the stator currents are zeroed.

By elaborating on the above system, it is possible to determine the two differential equations giving the rotor flux evolutions (φQs(t) and φDs(t)) with null stator currents. They are:

$$0 = \frac{d^2 \varphi Qs}{dt^2} + \frac{2}{T_R} \frac{d\varphi Qs}{dt} + \left(\frac{1}{T_R^2} + \omega_r^2\right)\varphi Qs \quad \text{Equations 2.1 and 2.2}$$

$$0 = \frac{d^2 \varphi Ds}{dt^2} + \frac{2}{T_R} \frac{d\varphi Ds}{dt} + \left(\frac{1}{T_R^2} + \omega_r^2\right)\varphi Ds$$

To integrate every one of this second order equation, two initial conditions are needed. We can identify these conditions with the value at t=0+ of the unknown variable and with the value at t=0+ of the first order derivative of the unknown variable. So, the initial conditions for the φQs equation could be:

$$\varphi Qs0 = \varphi Qs(0+)$$

$$\dot{\varphi} Qs0 = \frac{d\varphi Qs}{dt}\bigg|_{t=0+}$$

The initial conditions for the φDs equation could be:

$$\varphi Ds0 = \varphi Ds(0+)$$

-continued $$\varphi \dot{D}s0 = \frac{d\varphi Ds}{dt}\bigg]_{t=0+}$$

A discussion of these initial conditions is required.

The time t=0 is the instant when the stator current arrives at zero; t=0+ is an infinitesimal time after the stator current arrives at zero; t=0− is an infinitesimal prior the stator current arrives at zero.

First of all what we know is that the rotor flux component at t=0− and t=0+ must coincide and that is because the rotor stray inductance ($Id_R$) preserves the continuity of every single components of the rotor current (in this moment, the rotor flux is totally generated by the rotor current as the stator current is null).

Thus, we can write:

φQs(0+)=Qs(0−)

φDs(0+)=φDs(0−)

Besides we already explained that the stator current decaying transient, after switching off the power transistors, has extinguished before the magnetisation current has substantial decayed. So, at least we can assume that the amplitude of the rotor flux phase (φR0) is almost equal to the value it had at the moment the power transistors were switched off (φRold)

φR0=√(φQs0²+φDs0²)≃φRold      Formula 3

As will be seen, this approximation is not required for the next calculations, but it is useful to evaluate the order of magnitude of the quantities involved in the next calculations.

The initial conditions for the derivative are directly related to φQs0 and φDs0. In fact, by combining the Equation 1.7 with the Equation 1.3 of the dynamic model, we get:

$$\frac{d\varphi Qs}{dt} = \omega_r \varphi Ds - \frac{\varphi Qs}{T_R}$$

and at t=0+ it becomes:

$$\frac{d\varphi Qs}{dt}\bigg]_{t=0+} = \omega_r \varphi Ds(0+) - \frac{\varphi Qs(0+)}{T_R} \quad \text{Formula 4}$$

$$\frac{d\varphi Qs}{dt}\bigg]_{t=0+} = \omega_r \varphi Ds0 - \frac{\varphi Qs0}{T_R} = \varphi \dot{Q}s0$$

On the other hand, by combining the Equation 1.8 with the Equation 1.4 of the dynamic model, we get:

$$\frac{d\varphi Ds}{dt} = -\omega_r \varphi Qs - \frac{\varphi Ds}{T_R}$$

and at t=0+ it becomes:

$$\frac{d\varphi Ds}{dt}\bigg]_{t=0+} = -\omega_r \varphi Qs(0+) - \frac{\varphi Ds(0+)}{T_R} \quad \text{Formula 5}$$

$$\frac{d\varphi Ds}{dt}\bigg]_{t=0+} = -\omega_r \varphi Qs0 - \frac{\varphi Ds0}{T_R} = \varphi \dot{D}s0$$

So, the initial conditions on the derivative of the unknown variables are a linear combination of the initial values of the unknown variables (φQs0 and φDs0).

The integrals of the Equations 2.1 and 2.2 after the substitution of the initial conditions are:

$$\varphi Qs(t) = \sqrt{\varphi Qs0^2 + \varphi Ds0^2}\, e^{-\frac{t}{T_R}} \cos\left(\omega_r t + \arccos \frac{\varphi Qs0}{\sqrt{\varphi Qs0^2 + \varphi Ds0^2}}\right)$$

$$\varphi Ds(t) = \sqrt{\varphi Qs0^2 + \varphi Ds0^2}\, e^{-\frac{t}{T_R}} \sin\left(\omega_r t + \arccos \frac{\varphi Qs0}{\sqrt{\varphi Qs0^2 + \varphi Ds0^2}}\right)$$

With the substitution of the Formula 3:

$$\varphi Qs(t) = \varphi R0\, e^{-\frac{t}{T_R}} \cos\left(\omega_r t + \arccos \frac{\varphi Qs0}{\varphi R0}\right)$$

$$\varphi Ds(t) = -\varphi R0\, e^{-\frac{t}{T_R}} \sin\left(\omega_r t + \arccos \frac{\varphi Qs0}{\varphi R0}\right)$$

With the Equations 1.1 to 1.4 we can easily pass from the rotor flux expressions to the stator flux expressions φqs and φds:

$$\varphi qs(t) = \frac{L_m}{L_R} \varphi R0\, e^{-\frac{t}{T_R}} \cos\left(\omega_r t + arccos \frac{\varphi Qs0}{\varphi R0}\right)$$

$$\varphi ds(t) = -\frac{L_m}{L_R} \varphi R0\, e^{-\frac{t}{T_R}} \sin\left(\omega_r t + arccos \frac{\varphi Qs0}{\varphi R0}\right)$$

Last, we can calculate the expressions of the stator phase voltages in the present conditions (null stator currents and sole rotor currents are circulating) with the derivative of the above stator flux components according with the Equation 1.5 and 1.6.

Equations 6.1 to 6.2

$$vqs(t) = \frac{L_m}{L_R} \varphi R0 \sqrt{\frac{1}{T_R^2} + \omega_r^2}\, e^{-\frac{t}{T_R}} \sin(\omega_r t + \alpha)$$

$$vds(t) = \frac{L_m}{L_R} \varphi R0 \sqrt{\frac{1}{T_R^2} + \omega_r^2}\, e^{-\frac{t}{T_R}} \cos(\omega_r t + \alpha)$$

with:

$$\alpha = \arctan g \left(\frac{-\frac{\varphi Qs0}{T_R} + \omega_r \varphi Ds0}{-\frac{\varphi Ds0}{T_R} - \omega_r \varphi Qs0}\right)$$

Equation 6.1 and 6.2 are the expressions of the voltage at the motor terminals with null stator currents after switching off the power transistors. We can see that the rotor speed information ($\omega_r$) is intrinsic in the amplitude and the frequency of both vqs and vds, but it is not of an immediate measurement.

To pull out, with a very short monitoring delay, the speed information from the vqs and vds evolutions a further step is needed.

Let us consider the two ratios vqs/vds and vds/vqs from the above Equation 6.1 and 6.2:

$$\frac{vqs}{vds} = tg(\omega_r t + \alpha)$$

$$\frac{vds}{vqs} = cotg(\omega_r t + \alpha)$$

Equations 7.1 and 7.2

By taking the derivative of both the Equations 7.1 and 7.2 we get:

$$\frac{d\left(\frac{vqs}{vds}\right)}{dt} = \frac{\omega_r}{\cos^2(\omega_r t + \alpha)}$$

$$\frac{d\left(\frac{vds}{vqs}\right)}{dt} = -\frac{\omega_r}{\sin^2(\omega_r t + \alpha)}$$

Equations 8.1 and 8.2

By considering a finite increment instead of an infinitesimal, Equations 8.1 and 8.2 may be approximated as follow:

$$\frac{\frac{vqs_n}{vds_n} - \frac{vqs_{n-1}}{vds_{n-1}}}{\Delta t} = \frac{\omega_r}{\cos^2(\omega_r t + \alpha)}$$

$$\frac{\frac{vds_{n-1}}{vqs_{n-1}} - \frac{vds_n}{vqs_n}}{\Delta t} = \frac{\omega_r}{\sin^2(\omega_r t + \alpha)}$$

Equations 9.1 and 9.2

Obviously, the time increment $\Delta t$ must be advantageously low with respect to the minimum period of the frequency range of the unknown variable ($\omega_r$) otherwise an error, in the speed measurement, may occur (an accurate discussion will follow).

By properly manipulating Equations 9.1 and 9.2 we get:

$$\cos^2(\omega_r t + \alpha) = \frac{\omega_r \Delta t}{\frac{vqs_n}{vds_n} - \frac{vqs_{n-1}}{vds_{n-1}}}$$

$$\sin^2(\omega_r t + \alpha) = \frac{\omega_r \Delta t}{\frac{vds_{n-1}}{vqs_{n-1}} - \frac{vds_n}{vqs_n}}$$

Equations 10.1 and 10.2

By adding component by component and elaborating on Equations 10.1 and 10.2 we get:

$$1 = \omega_r \Delta t \left( \frac{vqs_{n-1} vqs_n + vds_n vds_{n-1}}{vds_{n-1} vqs_n - vds_n vqs_{n-1}} \right)$$

Equation 11

Then:

$$\omega_r = \frac{1}{\Delta t} \left( \frac{vds_{n-1} vqs_n - vds_n vqs_{n-1}}{vqs_{n-1} vqs_n + vds_n vds_{n-1}} \right)$$

Formula 12

By picking up two pairs of values:

$vqs_{n-1}$ = vqs at instant $t_0$ $vqs_n$ = vqs at instant $t_0 + \Delta t$ $vds_{n-1}$ = vds at instant $t_0$ $vds_n$ = vds at instant $t_0 + \Delta t$ the Formula 12 provides the value together with the sign of the rotor speed.

Since the thus determined electrical angular speed of the rotor $\omega_r$ is related to the mechanical angular speed of the rotor $\Omega_r$ through $$\omega_r = p\omega_r$$

wherein p is the number of pole pairs, at last also the mechanical rotor angular speed can be determined as $\Omega_r = \omega_r / p$.

The time $t_0$ is a generic time instant after switching off the power transistors that must satisfy three requirements only:
1) The stator currents after switching off the power transistors are null;
2) The vqs and vds readings must be settled down (i.e. normally vqs and vds are filtered before they enter the control/processing unit and so a delay is required (fraction of millisecond to few millisecs) in order that the filters are settled down after the transient generated by the switching off the power transistors is extinguished);
3) The rotor currents are not substantially decayed yet.

That means the $t_0$ instant normally should be chosen within a window from a fraction of a millisecond up to the motor time constant ($T_R$) after switching off the power transistors.

The important matter is that there is no requirement on the phase angle of the vqs and vds evolutions for the $t_0$ matching. So the monitor procedure may start (switching off the power transistors) in an absolute asynchronous instant respect to the phase angle of the stator voltages.

Thus, the speed monitoring procedure takes a very short time ($t_0 + \Delta t$ if we count the time from the instant t=0 of switching off the power transistors) to collect the two pairs of voltage values ($vqs_{n-1}$, $vqs_n$, $vds_{n-1}$, $vds_n$). Then the control/processing unit switches on the power transistors again to come back to the standard motor control with injection of sinusoidal stator currents.

In a second step the control/processing unit will process the collected data to calculate the motor speed (with sign) following Formula 12.

With respect to the accuracy of Formula 12 we should deepen three issues:
1) Error introduced by applying the Formula 12 for the speed calculation.
2) Similar or alternative formulas for the speed calculation.
3) Rule for the choice of a correct time increment (at).

Formula 12 is approximated because during the above elaboration, we passed from infinitesimal to finite time increment (from Equations 8.1 and 8.2 to Equations 9.1 and 9.2). This passage is justified because we apply a Digital Signals Processing to the collected voltage data. In a digital calculation it is automatic to approximate the derivative of a signal as ratio between a finite signal increment on a finite time increment. This approximation introduces an error between calculated and real motor speed.

Fortunately we can measure this error in a very accurate way. In fact it is just enough to exploit the information that the vqs and vds wave shapes are known (Equations 6.1 and 6.2). Then we can substitute Equations 6.1 and 6.2 in the second member in Formula 12 to find the precise relationship between the second element in Formula 12 and the motor speed.

$$V_M = \frac{L_m}{L_R} \varphi R 0 \sqrt{\frac{1}{T_R^2} + \omega_r^2}$$

Equations 13.1 to 13.5

-continued $$vqs_n = V_M e^{-\frac{t}{T_R}} \sin[\omega_r(t_0 + \Delta t) + \alpha]$$

$$vqs_{n-1} = V_M e^{-\frac{t}{T_R}} \sin[\omega_r t_0 + \alpha]$$

$$vds_n = V_M e^{-\frac{t}{T_R}} \cos[\omega_r(t_0 + \Delta t) + \alpha]$$

$$vds_{n-1} = V_M e^{-\frac{t}{T_R}} \cos[\omega_r t_0 + \alpha]$$

By introducing Equations 13.2 to 13.5 in the second element in Formula 12 and rearranging terms we find:

$$\frac{1}{\Delta t}\left(\frac{vds_{n-1}vqs_n - vds_n vqs_{n-1}}{vqs_{n-1}vqs_n + vds_n vds_{n-1}}\right) = \frac{tg(\omega_r \Delta t)}{\Delta t} \qquad \text{Formula 14}$$

Therefore, the exact meaning of the value calculated with the second element in Formula 12 is not directly the speed itself; rather it is the above ratio involving the tangent of $\omega_r \Delta t$ and the time increment $\Delta t$.

So the accurate speed will be calculated with the rigorous Formula 15 below (instead of the approximate Formula 12):

$$\omega_r = \frac{1}{\Delta t}\arctan g\left(\frac{vds_{n-1}vqs_n - vds_n vqs_{n-1}}{vqs_{n-1}vqs_n + vds_n vds_{n-1}}\right) \qquad \text{Formula 15}$$

The control/processing unit will calculate the ratio in parenthesis to determine the argument of the inverse tangent (arctang) first. Then the control/processing unit will pick-up the arctang value from a look-up table of the inverse tangent function corresponding to that argument. This means that it is necessary to include in the software the look-up table of the inverse tangent. Finally, the control/processing unit will determine the accurate angular speed value by dividing the inverse tangent value by the time increment $\Delta t$.

The above discussion shows that there are more than one Formula that can be possibly used for the speed calculation: some are rigorous (see Formula 15) some other are approximate (see Formula 12).

To further confirm this statement, we can easy find another approximate Formula by considering the following term:

$$vds\frac{dvqs}{dt} - vqs\frac{dvds}{dt} \qquad \text{Formula 16}$$

If we assume the exponential term in the vqs and vds expressions (equations 6.1 and 6.2) changes much slower than the sine or cosine factor, we can assume the exponential factors are constant in time. So the substitution of the Equation 6.1 and 6.2 in the Formula 16 gives the following approximate result for the speed calculation:

$$\omega_r = \frac{1}{\Delta t}\left(\frac{vds_{n-1}vqs_n - vds_n vqs_{n-1}}{vqs_n^2 + vds_n^2}\right) \qquad \text{Formula 17}$$

This is quite similar to the Formula 12 but less accurate than that.

This aspect of several formulas for the speed calculation is pointed out because the inventive method is not the theoretical algorithm adopted for the speed calculation. One aspect of the invention is the idea to stop the control for the shortest possible time to collect data and to measure the motor speed. In order that collecting the samples takes the shortest time, it does not matter which algorithm among the Formula 12, Formula 15, Formula 17 or the like is used. It only matters that the Formula used for the speed calculation works at least on a pair of samples per phase voltage, picked up within a proper time increment ($\Delta t$).

Let us discuss about the correct choice for the time increment ($\Delta t$) in order that the speed measurement does not fail. In fact Formula 14 works only unambiguously if the argument of the tangent ($\omega_r \Delta t$) is in the window 0 to $\pi/2$ (for a positive $\omega_r$), otherwise the speed may result wrong in both magnitude and sign. That means the time increment must be chosen with the Formula 18 below:

$$\Delta t < \frac{\pi}{2\omega_{rmax}} = \frac{T_{min}}{4} \qquad \text{Formula 18}$$

$$T_{min} = \frac{2\pi}{\omega_{rmax}}$$

Here, $\omega_{r\,max}$ is the superior limit for the speed range. When $\omega_{r\,max}$ is known, the time increment must be lower than the fourth part of the period ($T_{min}$) of this maximum angular speed.

At last, it is specified that in the above theoretical analysis we always considered the speed to be constant within the monitoring time ($\Delta t$). This is an approximation. In reality, speed may change in the monitoring interval.

Without deepening the analysis, we could consider that, when the speed changes vs. time increment ($\Delta t$), Formula 15 provides an intermediate value between the speed at instant $t_0$ and the speed at instant $t_0 + \Delta t$. This is a kind of a mean value within the time increment.

Speed Detection with Sense Coils

The above-described method is still valid when the stator voltages are picked up through windings mutually coupled with the motor phases. Such a method is disclosed in the documents IT PR2004A000009 and US 2005/0189902 A1.

Then there is no difference in the above analysis but the vqs and vds voltages are picked-up by/from these mutually coupled windings (sense coils) and not directly taken from the motor terminals.

BRIEF DESCRIPTION OF THE DRAWINGS

The method will be further explained in the following embodiments of the invention with reference to the accompanying drawings, wherein.

DETAILED DESCRIPTION OF THE INVENTION

For our practical angular speed measurement arrangement, the stator voltages must be attenuated to match the input voltage range of the Analog to Digital converter inside the control/processing unit.

For our practical speed measurement arrangement it is not strictly necessary that the stator voltages are filtered but these filters are normally required for the standard motor control, to separate the main frequency from the harmonics of the PWM (Pulse Width Modulation) or SVM (Space Vector Modulation) technique. In fact, the standard control uses PWM or SVM technique to generate the stator voltages: so the stator voltages harmonics consists of a main frequency in the range 0 to 300 Hz (or the like) and several higher frequency harmonics due to PWM or SVM technique.

Figure 4:
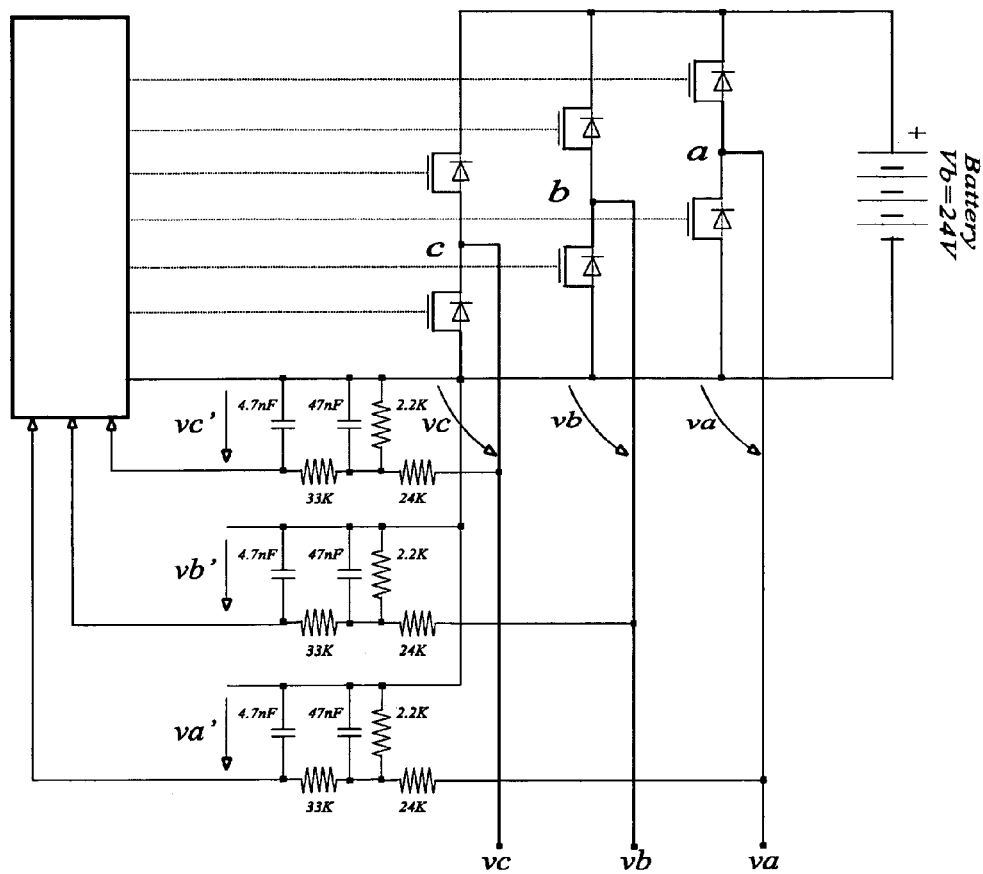
FIG. 4 illustrates a possible solution for an interface circuit between the stator voltages va, vb and vc and the control/processing unit. This network is used to attenuate and filter the signals before they enter the control/processing unit.

Since the filters are required by the standard motor control mode, we consider an interface circuit with both attenuation and filtering functions between stator voltages and control/processing unit. Obviously, regarding the speed measurement only, it is better to save (or to limit) the filtering in order to minimize the settlement delay between the stator currents getting zeroed and the output of the filters is settled down. This interface circuit is shown in FIG. 4. This is just an example: several different interface circuits can work properly in its replacement.

To perform the speed measurement following the inventive method, we used an 800 W induction motor for a 24V battery with $L_R$=1.16 mH, $R_R$=33 mohms and $T_R$=35 msec. Two speed measurements are documented here: $\omega_r$=+44 Hz in FIG. 5 and $\omega_r$=+98 Hz in FIG. 6. In both cases we forced the motor moving at the specified speed, meanwhile the control/processing unit is disabled. Then we turned on the control/processing unit. The control algorithm uses a PWM technique (see FIG. 5 and FIG. 6) to generate the main frequency in the motor. It starts from a null frequency and increases. Due to the high rotor speed and the low frequency, the slip is high and the control is not tuned (it is in the Imax Clamped area with collapsed torque of FIG. 1). Then the control/processing unit switches off the power transistors, waits for about two milliseconds long for the stator currents to arrive at zero and the filters output to settle down. Then it picks up the first triad of samples (va'$_{n-1}$, vb'$_{n-1}$ and vc'$_{n-1}$) at instant $t_0$ (see FIG. 5 or FIG. 6). From this set of signals the control/processing unit calculates the first pair of values:

$$vas_{n-1} = va'_{n-1} - vb'_{n-1}$$

and $$vbs_{n-1} = vb'_{n-1} - vc'_{n-1}$$

By applying the Clarke transformation (Formula 1) to this pair of values the control/processing unit determines vds$_{n-1}$ and vqs$_{n-1}$ at instant $t_0$.

After a further delay $\Delta t$=250 microsec a second pair of values is picked up with the same procedure (vqs$_n$ and vds$_n$ at instant $t_0 + \Delta t$).

To complete the signal acquirement, in our arrangement we collect further pairs of values at instants t=$t_0$+1 msec, t=$t_0$+1.25 msec, t=$t_0$+2 msec, t=$t_0$+2.25 msec and in such a way we used several combinations of increments and time increments ($\Delta t$).

Figure 5:
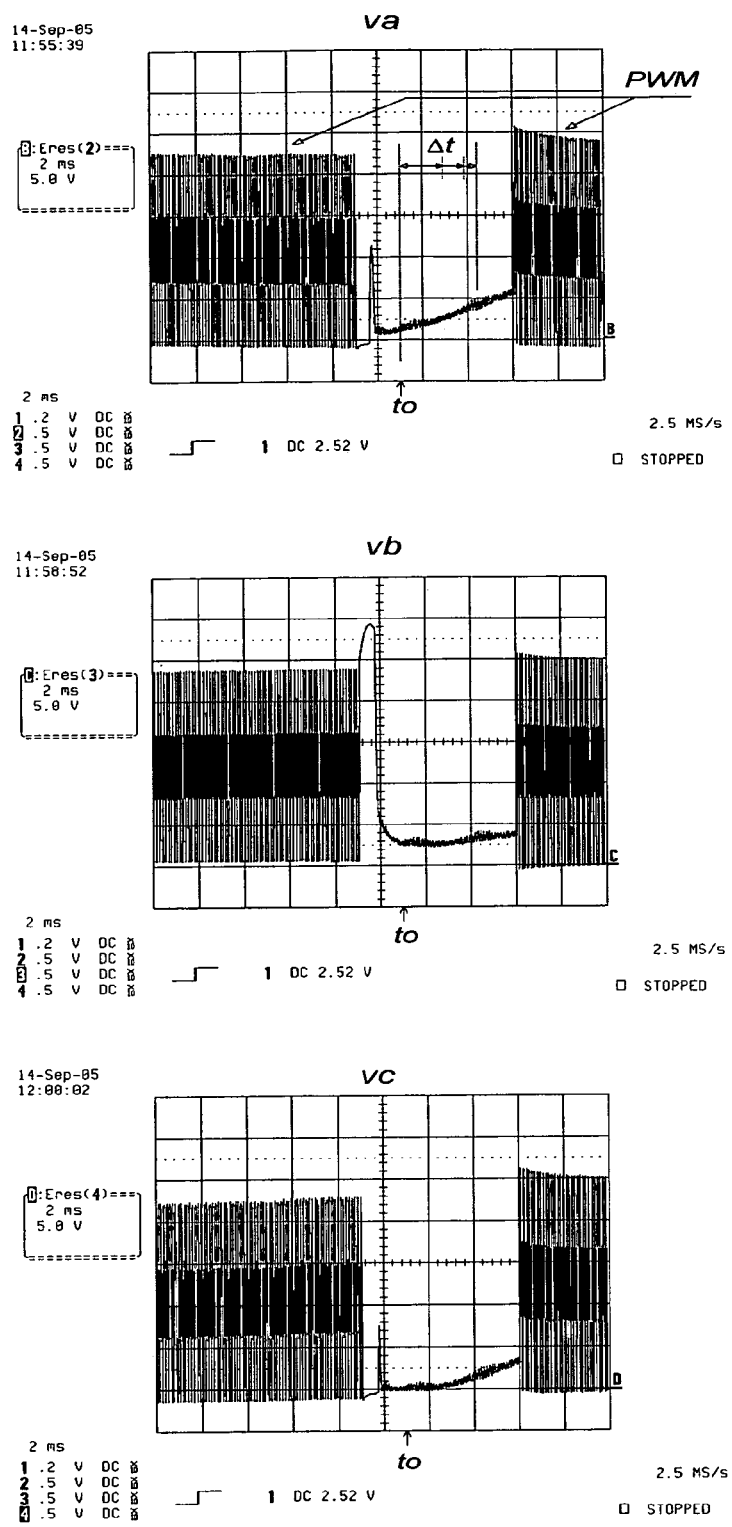
FIG. 5 illustrates the voltage wave shapes at the terminals of a real three phase induction motor (va, vb and vc) when the motor shaft is rotating at a speed of 44 Hz. They are picked-up with an oscilloscope. The time interval without PWM shows the voltages wave shape during the monitoring procedure after switching off the power transistors.
Figure 6:
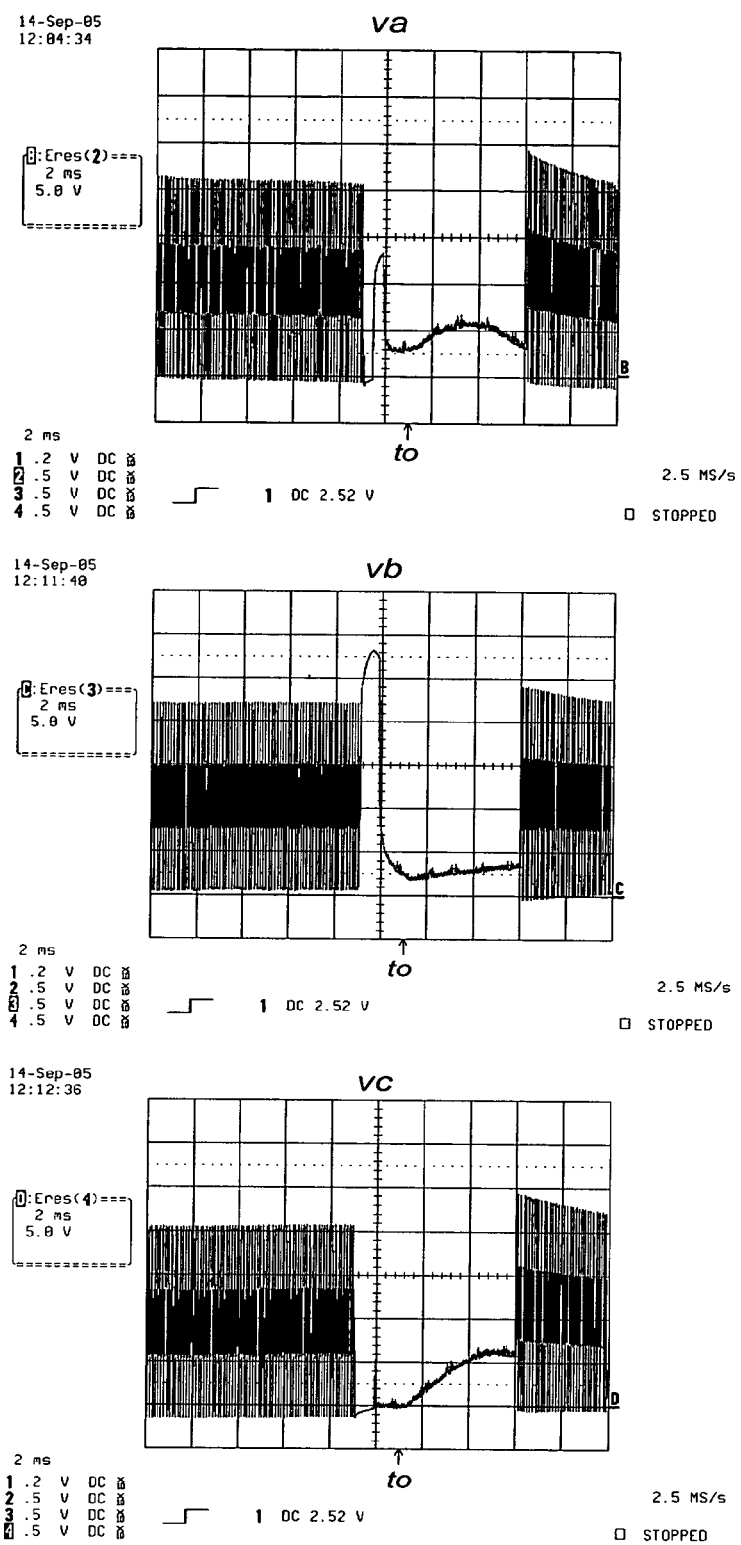
FIG. 6 illustrates the voltage wave shapes at the terminals of a real three phase induction motor (va, vb and vc) when the motor shaft is rotating at a speed of 98 Hz. They are picked-up with an oscilloscope. The time interval without PWM shows the voltage wave shapes during the monitoring procedure after switching off the power transistors.

After the compilation has ended (in our arrangement it takes about 7 msec) the control/processing unit switches on the power transistors again and comes back to the PWM standard motor control with injection of sinusoidal stator currents (see FIG. 5 and FIG. 6).

In a second step the control/processing unit will process the collected data. If both the increments vqs$_n$-vqs$_{n-1}$ and vds$_n$-vds$_{n-1}$, collected with a $\Delta t$=250 microsec delay, are too low for the Analog to Digital converter resolution, the control/processing unit tries to use the samples with a delay of $\Delta t$=1 msec.

If the increments are still too low, the control/processing unit tries to use samples with a delay of $\Delta t$=2 msec and so on by considering samples collected with an increasing delay until either the increment (vqs$_n$-vqs$_{n-1}$) or (vds$_n$-vds$_{n-1}$) assumes a consistent value. Obviously, when the speed is low the increments will be very low too, and then longer sampling delays ($\Delta t$) are supposed to match wider increments.

When the speed is high, the increments increase (according to Equations 6.1 and 6.2) and shorter sampling delays ($\Delta t$) are preferred to limit the error in the speed calculation (provided that the consistence of at least one increment is fulfilled). When a short time increment is chosen, it is possible to perform multiple speed calculations involving different pairs of samples. The resulting speed will be averaged over this collection of calculated values.

To complete the discussion on the consistence of the increments, let us consider that the increment amplitude depends also on the main flux in the motor ($\phi R0$) during the speed monitoring procedure. This does not matter because the final speed calculation (Formula 15) does not depend on the flux in the motor. Provided that at least one increment is consistent, the speed calculation is consistent too, disregarding the main flux amplitude.

After the speed calculation including the sign with Formula 15, the control/processing unit will quickly increase the frequency (with a blind ramp) from zero up to the speed of the motor with its sign. When the frequency meets the measured speed (synchronism) the control/processing unit comes back to the standard sensorless control algorithm and directs the frequency toward the commanded speed (e.g. imposed by a throttle).

Figure 1:
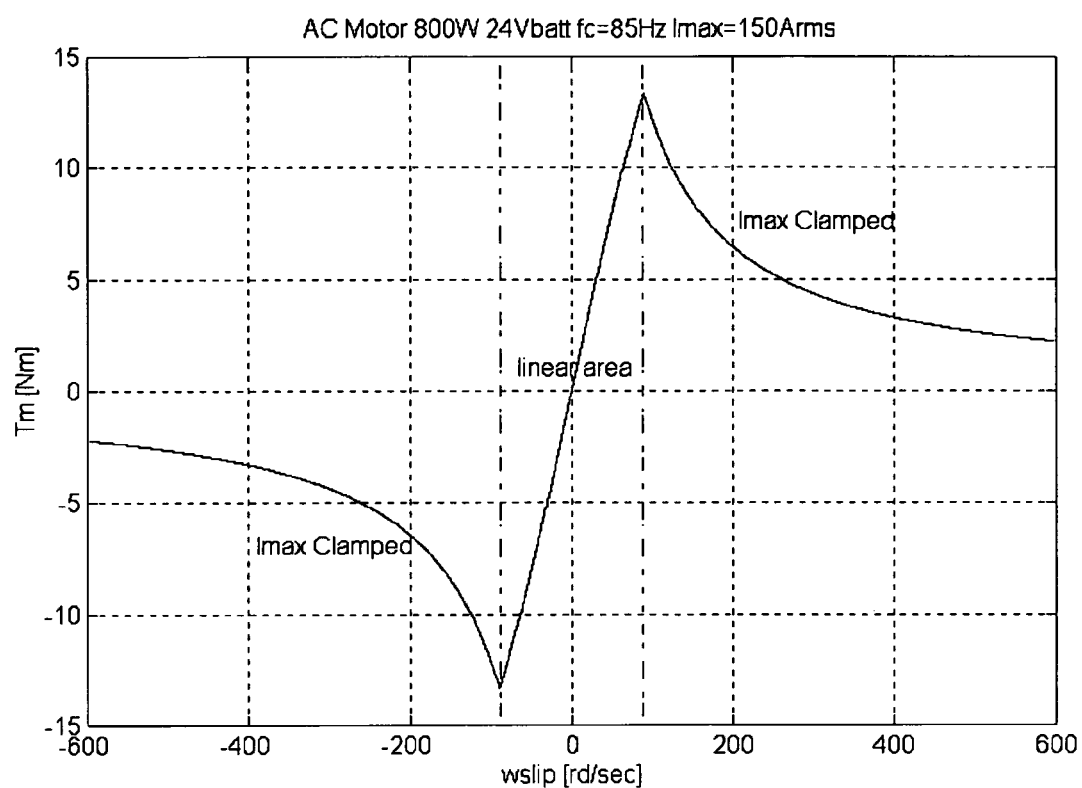
FIG. 1 illustrates the torque vs. $\omega$slip induction motor characteristic.
Figure 2:
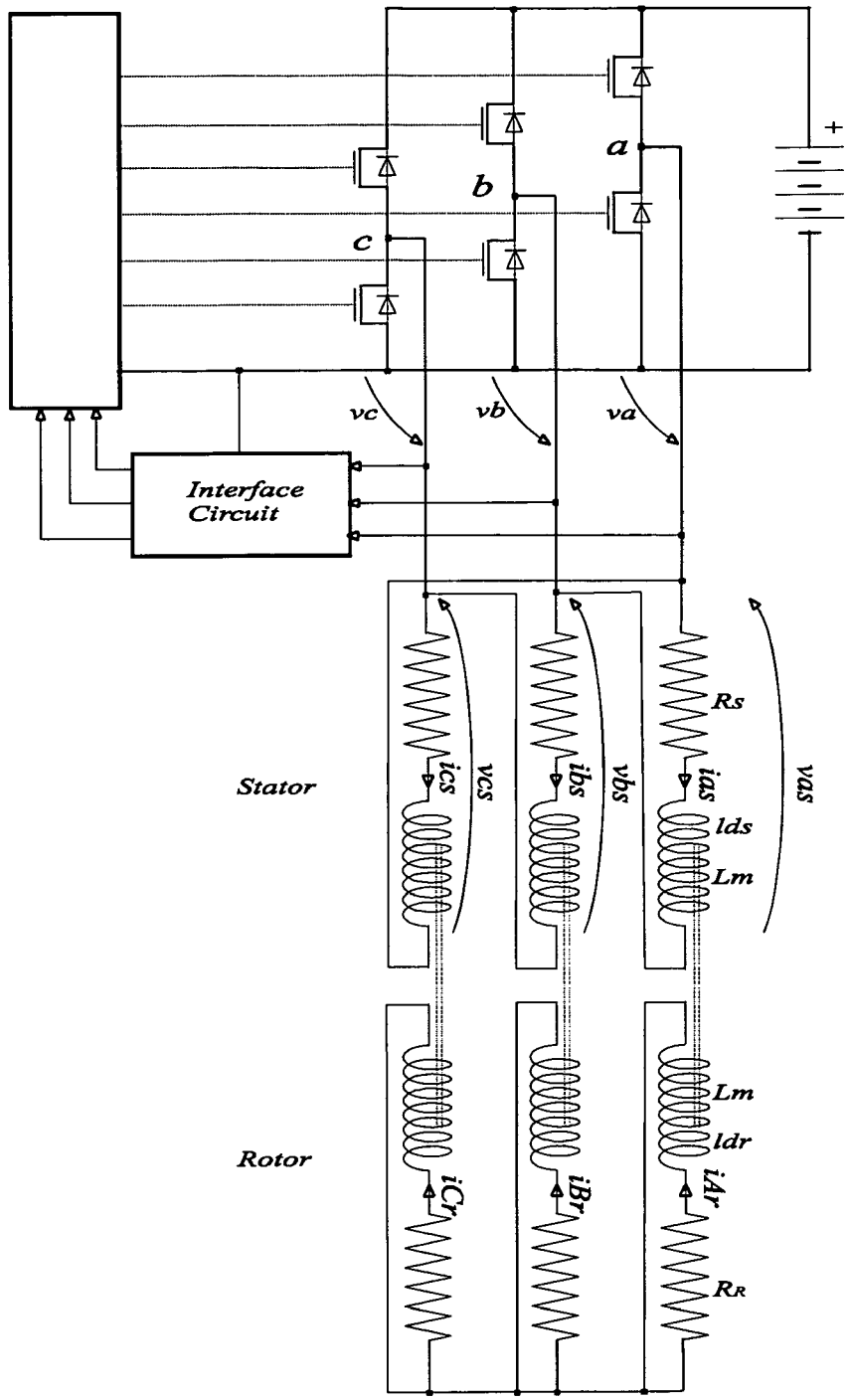
FIG. 2 illustrates a three phase inverter topology connected to a battery and supplying an induction motor. It shows also the control/processing unit performing all the activities to control the motor described here.
Figure 3:
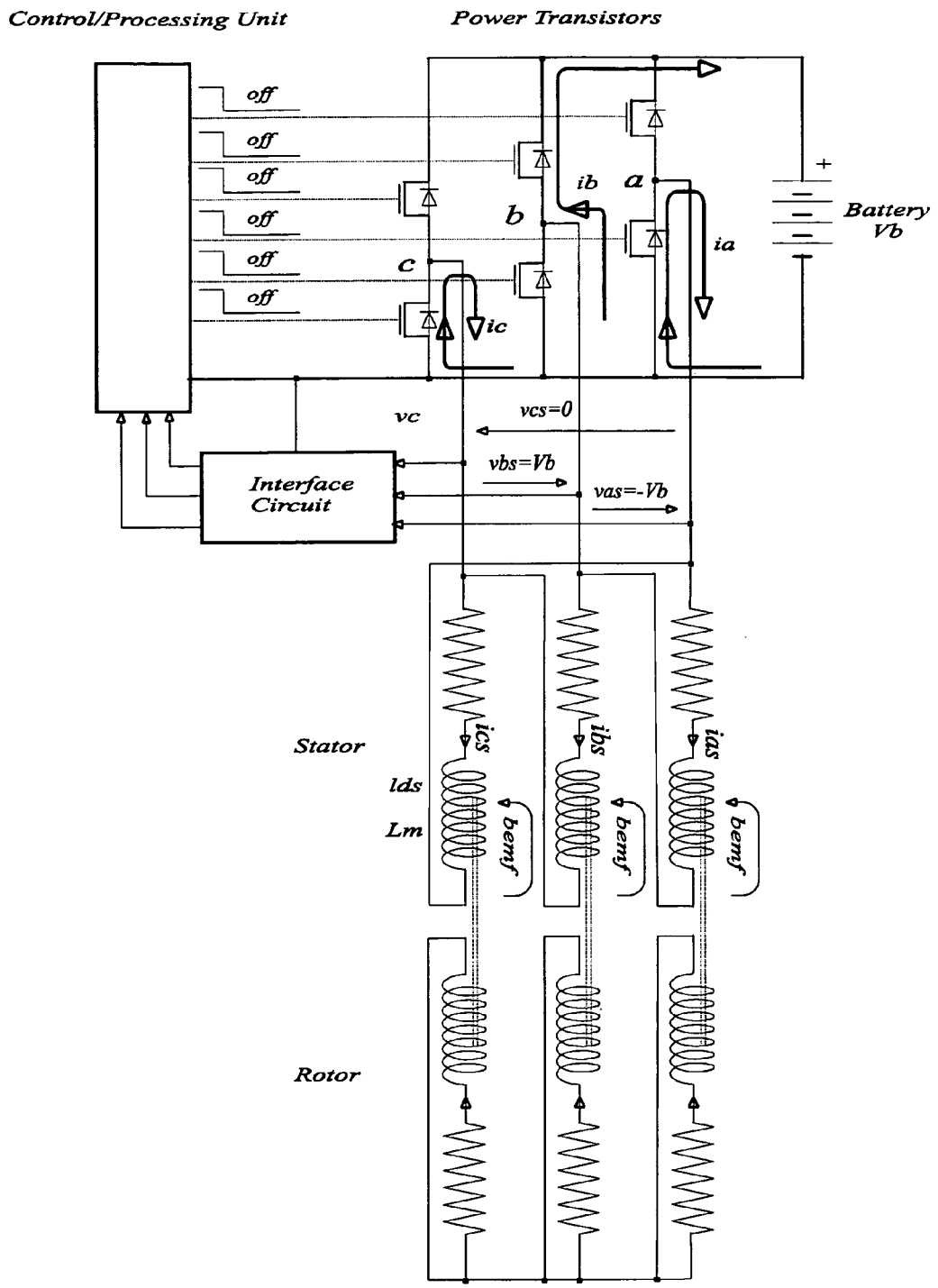
FIG. 3 illustrates the stator currents decaying courses after switching off the power transistors.

When the motor control is tuned with the motor speed (i.e. the working point is in the linear area of the torque vs. slip characteristic of FIG. 1) it is not more necessary to know the speed of the motor.

Usefulness of the Speed Measurement

With the above example we have already described a possible use for the speed measurement: the tuning of the sensorless control when the motor is already moving while switching on the control/processing unit.

Another use could be a repeated check of the control tuning by comparing in real time the applied frequency with the motor speed (e.g. a time scheduled speed monitoring will be executed every 200 msec). Obviously, in this case it is necessary to minimize the time duration of the initial time lag plus monitoring delay ($t_0+\Delta t$.) in order for the torque ripple due to the speed measurement to become lower.

If the torque ripple due to a continuous speed monitoring is not acceptable, it is possible to limit the continuous speed monitoring to the case when the applied frequency is very low. In fact it is well known that the problem of the sensorless control occurs in particular at low frequency. The reason is that at low frequency it is not possible to have a consistent flux and torque estimation because of the very low back electromotive forces in the motor phases. Then the voltage drops in the stray parameters of the motor are comparable with the back electromotive forces and the torque and flux estimation is highly inaccurate.

For all of the uses above described, when the control/processing unit discovers that the control is not tuned (i.e. the slip is too high and the working point is not in the linear area of the torque vs. slip characteristic) it must perform a control tuning operation: it consists of a fast ramp from the present frequency to the measured speed with its sign. When the frequency meets the measured speed (synchronism) the control/processing unit comes back to the standard sensorless control algorithm and directs the frequency toward the commanded speed.

These are only some possibilities of how to apply our speed measurement in a sensorless control.

The invention claimed is:

1. Method for determining the electric angular speed of a rotor of an induction motor, wherein electric power supplied to phases of a stator of the induction motor affects the rotor, comprising the steps of:
    switching off the electric power supply to the phases of the stator during a particular period of time,
    picking-up signals corresponding to voltages at the stator phases within the particular period of time, and
    determining the electric angular speed of the rotor based on the picked-up signals,
    wherein the signals are picked-up in a time series comprising one or more pairs of points in time, each pair comprising a first and a second point in time with a time increment in between, and at least two points in time of the time series being coincident for each stator phase,
    wherein the time increment for each pair of points in time is smaller than one quarter of the revolution period of an upper limit to the electric angular speed.

2. Method according to claim 1, wherein picking-up the signals begins after a time lag to has elapsed since the electric power has been switched off.

3. Method according to claim 2, wherein the time lag to is greater than a decay time it takes for the stator currents to zero out since the electric power has been switched off.

4. Method according to claim 2, wherein the time lag to is smaller than exponential decay times of magnetisation currents that flow in the rotor at the time the electric power is switched off.

5. Method according to claim 1, wherein the time increment is equal for each pair of points in time.

6. Method according to claim 1, wherein a time difference between successive pairs of points in time is constant in time or wherein the time difference between successive pairs of points in time increases with time or wherein a time difference between successive pairs of points in time decreases with time.

7. Method according to claim 1, wherein the voltages at the stator phases are determined based on the picked-up signals.

8. Method according to claim 1, wherein the induction motor is controlled sensorless, preferably according to the difference between a frequency of the electric power supplied to the stator and the angular rotor speed.

9. Method according to claim 1, wherein an inverter comprising power transistors is provided for supplying the electric power to the stator phases.

10. Method according to claim 1, wherein a control/processing unit is provided for controlling and processing purposes.

11. Method according to claim 10, wherein the switching is performed by the control/processing unit.

12. Method according to claim 10, wherein the electric angular speed of the rotor is determined by the control/processing unit.

13. Method according to claim 1, wherein at least one interface unit is provided for attenuating and/or filtering the picked-up signals, wherein a control/processing unit is provided for controlling and processing purposes, and wherein the at least one interface unit is provided between the phases of the stator and the control/processing unit.

14. Method according to claim 13, wherein picking-up the signals begins after a time lag to has elapsed since the electric power has been switched off, and wherein the time lag to is greater than a decay time of transients generated in the at least one interface unit by the switching off of the electric power supply.

15. Method according to claim 1, wherein the stator signals or voltages are picked-up via at least two sensing coils mutually coupled to at least two phases of the stator.

16. Method according to claim 1, wherein the motor is a three phase induction motor or a two phase induction motor.

17. Method according to claim 16, wherein in the case of a three phase induction motor the angular speed of the rotor is determined based on an equivalent two-phase model of electrical components of the three phase induction motor.

18. Method according to claim 1, wherein the determination of the angular speed of the rotor begins and preferably as well ends within the particular period of time.

19. Method according to claim 1, wherein the determination of the angular speed of the rotor begins after the particular period of time.

20. Method according to claim 1, wherein a mechanical angular speed of the rotor is determined based on the determined electric angular speed of the rotor.

* * * * *